(12) United States Patent
Kawahata et al.

(10) Patent No.: US 11,908,622 B2
(45) Date of Patent: Feb. 20, 2024

(54) CAPACITOR

(71) Applicant: Panasonic Intellectual Property Management Co., Ltd., Osaka (JP)

(72) Inventors: Motohiro Kawahata, Shimane (JP); Eiji Koba, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 198 days.

(21) Appl. No.: 17/373,581

(22) Filed: Jul. 12, 2021

(65) Prior Publication Data

US 2021/0343474 A1 Nov. 4, 2021

Related U.S. Application Data

(63) Continuation of application No. PCT/JP2020/001434, filed on Jan. 17, 2020.

(30) Foreign Application Priority Data

Feb. 5, 2019 (JP) ................................ 2019-018888

(51) Int. Cl.
  *H01G 2/04* (2006.01)
  *H01G 4/224* (2006.01)
  *H01G 4/228* (2006.01)

(52) U.S. Cl.
  CPC ............. *H01G 2/04* (2013.01); *H01G 4/224* (2013.01); *H01G 4/228* (2013.01)

(58) Field of Classification Search
  CPC .......... H01G 2/04; H01G 4/224; H01G 4/228; H01G 4/30; H01G 4/32; H01G 4/38; H10G 4/32; H10G 4/224

USPC ... 361/301.3, 301.5, 513, 834, 306.3, 321.1, 361/321.3, 301.4
  See application file for complete search history.

(56) References Cited

U.S. PATENT DOCUMENTS

| | | | |
|---|---|---|---|
| 7,660,099 B2 * | 2/2010 | Imamura | H01G 9/008 361/301.5 |
| 2005/0263845 A1 * | 12/2005 | Saito | H01G 4/38 257/532 |
| 2009/0040685 A1 * | 2/2009 | Hiemer | H01G 9/028 361/301.5 |

(Continued)

FOREIGN PATENT DOCUMENTS

WO     2017/081853     5/2017

OTHER PUBLICATIONS

International Search Report of PCT application No. PCT/JP2020/001434 dated Feb. 18, 2020.

*Primary Examiner* — Arun Ramaswamy
(74) *Attorney, Agent, or Firm* — Rimon P.C.

(57) ABSTRACT

Capacitor includes a capacitor element unit and a case that is made of a metal and houses the capacitor element unit. The capacitor element unit includes a capacitor element, a first bus bar and a second bus bar that are connected to the capacitor element, and an insulating member disposed between the first bus bar and the second bus bar. The insulating member includes a first mounting portion, and the case includes a second mounting portion to which the first mounting portion is attached so that the capacitor element unit is located at a predetermined position with respect to the case while the first bus bar and the second bus bar are not in contact with the case.

14 Claims, 8 Drawing Sheets

(56) References Cited

U.S. PATENT DOCUMENTS

| | | | | |
|---|---|---|---|---|
| 2009/0059467 A1* | 3/2009 | Grimm | ............... | H01G 9/10 |
| | | | | 361/301.5 |
| 2015/0256096 A1* | 9/2015 | Nishizawa | ............. | B60L 50/61 |
| | | | | 361/306.1 |
| 2017/0062134 A1* | 3/2017 | Koyama | ................ | H01G 4/38 |
| 2018/0233285 A1 | 8/2018 | Sato et al. | | |

* cited by examiner

US 11,908,622 B2

CAPACITOR

RELATED APPLICATIONS

This application is a continuation of the PCT International Application No. PCT/JP2020/001434 filed on Jan. 17, 2020, which claims the benefit of foreign priority of Japanese patent application No. 2019-018888 filed on Feb. 5, 2019, the contents all of which are incorporated herein by reference.

TECHNICAL FIELD

The present invention relates to a capacitor.

BACKGROUND

Conventionally, there has been known a capacitor including a capacitor element unit having the following configuration: a bus bar is connected to each of electrodes formed on both end faces of the capacitor element, and a part of the bus bar is overlapped with an insulating plate interposed therebetween; and the capacitor element unit is housed in a resin case. A film capacitor as an example of such a capacitor is described in, for example, WO 2017/081853.

In the film capacitor of International Publication WO 2017/081853, the capacitor unit is supported by a plurality of support ribs formed on a bottom surface of the case such that the lower bus bar connected to the capacitor element faces the bottom surface of the case in such a manner that a slight gap is formed between the lower bus bar and the bottom surface of the case. In this case, the lower bus bar is in contact with the support ribs, which are a part of the case.

SUMMARY

A capacitor according to a main aspect of the present invention includes: a capacitor element unit; and a case that is made of a metal and houses the capacitor element unit. The capacitor element unit includes: a capacitor element; a first electrode disposed on one of both end faces of the capacitor element; a second electrode disposed on another one of the both end faces of the capacitor element; a first bus bar connected to the first electrode, the first bus bar including a first region; a second bus bar connected to the second electrode, the second bus bar including a second region facing the first region; and a first insulating member that has an insulation property and is disposed between the first region and the second region. The first insulating member includes a first mounting portion, and the case includes a second mounting portion to which the first mounting portion is attached so that the capacitor element unit is located at a predetermined position with respect to the case while the first bus bar and the second bus bar are not in contact with the case.

According to the present invention, the capacitor element unit can be located at a predetermined position with respect to the case while ensuring insulation between the bus bars and the metal case.

Effects and meanings of the present invention will be further clarified in the following description of an exemplary embodiment. However, the exemplary embodiment shown below is merely one example of implementation of the present invention, and the present invention is not at all limited to the examples described in the following exemplary embodiment.

DESCRIPTION OF EMBODIMENT

Figure 1A:
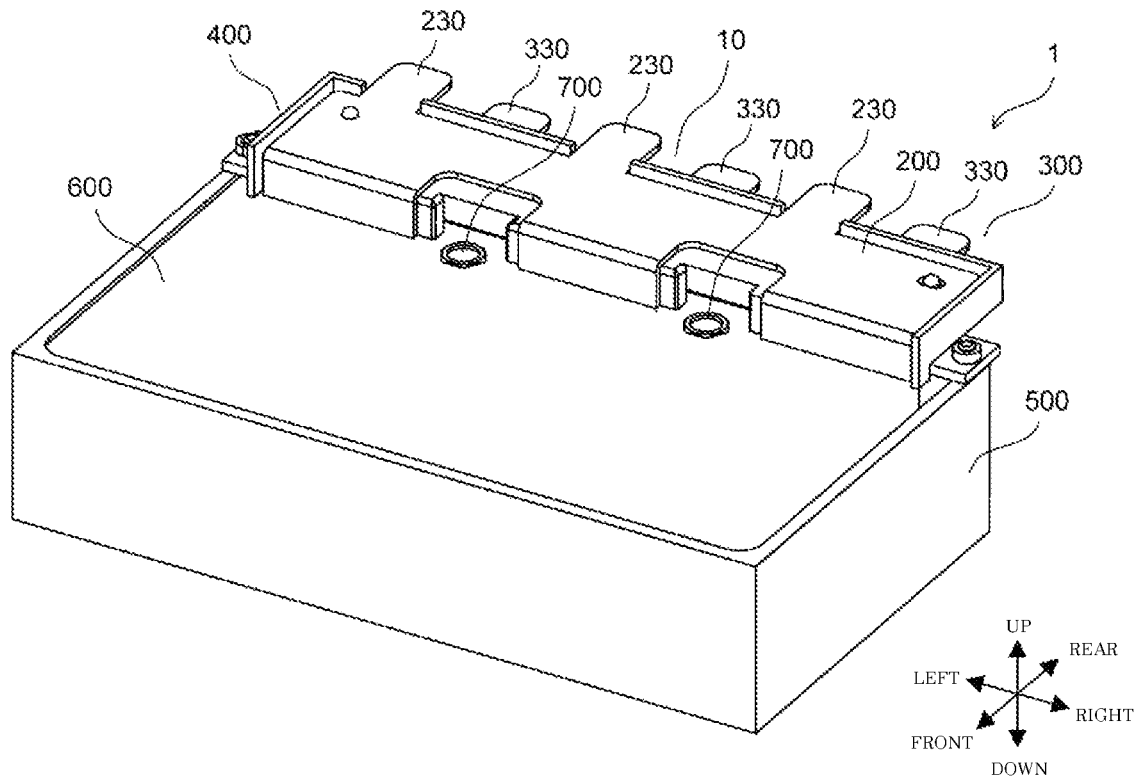
FIG. 1A is a perspective view illustrating a film capacitor according to an exemplary embodiment.

In recent years, capacitors have been started to be used in electric vehicles along with the spread of electric vehicles. For example, a usage mode can be adopted in which a capacitor is connected to a power supply device for driving an electric motor or the like. In this case, a large current tends to flow from the power supply device to the capacitor, and thus the capacitor element and the bus bars are likely to generate heat. Hence, the temperature of the capacitor tends to become high.

In order to achieve a capacitor having high heat dissipation, it is conceivable to use a metal case instead of a resin case.

However, in the case where the case is made of metal as described above, the following problem may arise. As in the case of the film capacitor of International Publication WO 2017/081853, when a configuration is adopted in which the capacitor element unit is located at a predetermined position in a state that a bus bar is in contact with the case, a current flowing through the bus bar may flow to the case.

In view of such a problem, the present invention provides a capacitor with which a capacitor element unit can be located at a predetermined position with respect to a metal case while ensuring insulation between a bus bar and the case.

Hereinafter, film capacitor 1, which is an exemplary embodiment of a capacitor of the present invention, will be described with reference to the drawings. For the sake of convenience, directions including front and rear, left and right, and up and down are added to the drawings as appropriate. Note that directions in the drawings are not absolute directions but relative directions in film capacitor 1. In addition, for convenience of description, some components are sometimes named according to the illustrated direction, for example, a "bottom surface portion" and a "front surface portion".

In the present exemplary embodiment, film capacitor 1 is an example of a "capacitor" recited in the claims. First end-face electrode 110 corresponds to a "first electrode" recited in the claims, and second end-face electrode 120 corresponds to a "second electrode" described in the claims. First body portion 210 corresponds to a "first region" recited in the claims, and second body portion 310 corresponds to a "second region" recited in the claims Second electrode terminal portion 320 corresponds to an "electrode connection portion" recited in the claims. Insulating plate 400 corresponds to a "first insulating member" recited in the claims. Mounting tab 430 corresponds to a "first mounting portion" recited in the claims Mounting boss 520 corresponds to a "second mounting portion" recited in the claims Bolt 700 corresponds to a "screw" recited in the claims.

Meanwhile, the above description is only intended to define correspondences between components in the claims and components in the exemplary embodiment. The correspondences described above do not limit the invention described in the claims to the configuration described in the exemplary embodiment.

Figure 1B:
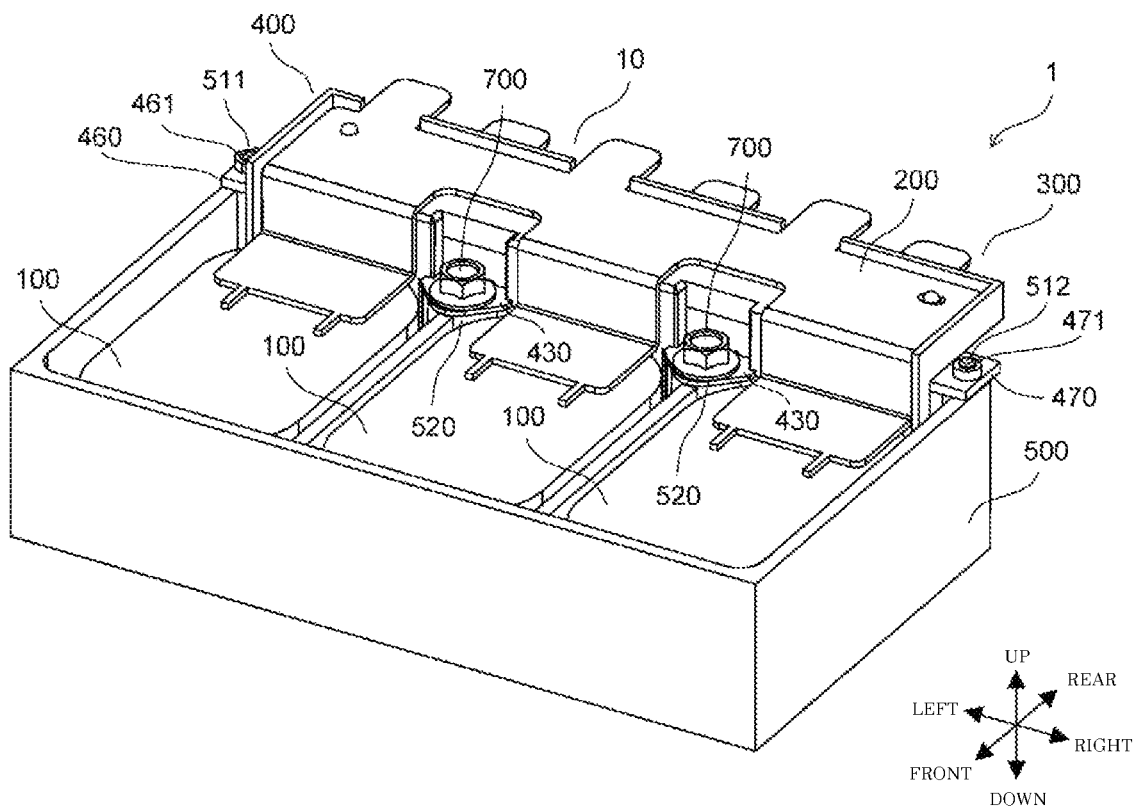
FIG. 1B is a perspective view illustrating the film capacitor according to the exemplary embodiment before a case is filled with a filler resin.

FIG. 1A is a perspective view illustrating film capacitor 1, and FIG. 1B is a perspective view illustrating film capacitor 1 before case 500 is filled with filler resin 600.

As shown in FIGS. 1A and 1B, film capacitor 1 includes three capacitor elements 100, first bus bar 200, second bus bar 300, insulating plate 400, case 500, and filler resin 600. Three capacitor elements 100, first bus bar 200, second bus bar 300, and insulating plate 400 are integrally assembled to constitute capacitor element unit 10. Capacitor element unit 10 is housed in case 500, and case 500 is filled with filler resin 600. Filler resin 600 is a thermosetting resin, for example, an epoxy resin. Case 500 and filler resin 600 protect a part of capacitor element unit 10 buried in filler resin 600 from moisture and impact.

Figure 2A:
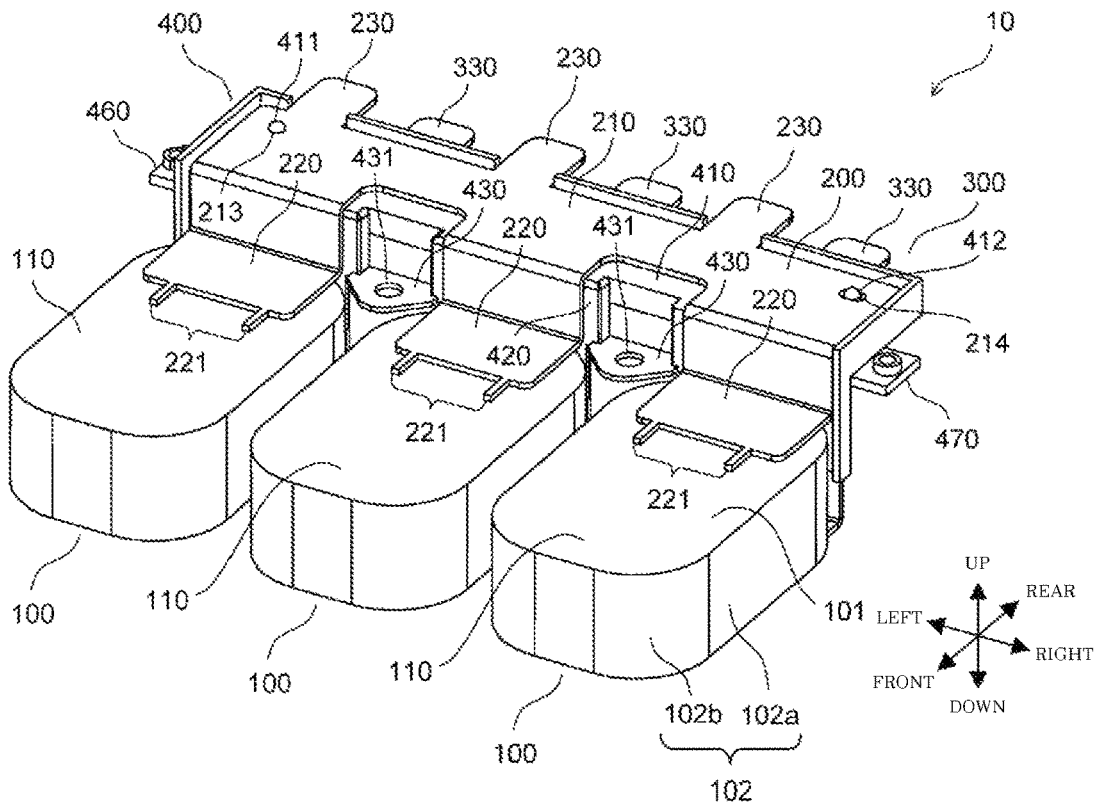
FIG. 2A is an upper front perspective view illustrating the capacitor element unit according to the exemplary embodiment.
Figure 2B:
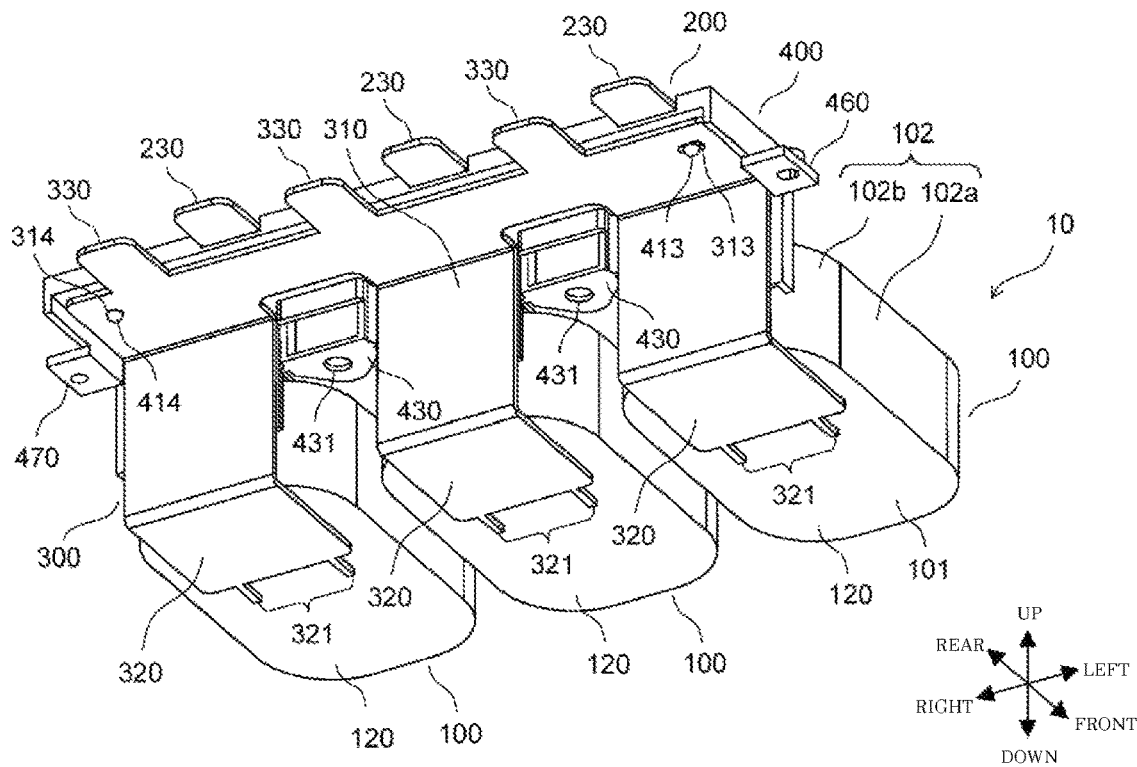
FIG. 2B is a lower rear perspective view illustrating the capacitor element unit according to the exemplary embodiment.

FIG. 2A is an upper front perspective view illustrating capacitor element unit 10, and FIG. 2B is a lower rear perspective view illustrating capacitor element unit 10.

Capacitor element 100 is formed by stacking, one on the other, two metalized films in each of which aluminum is vapor-deposited on a dielectric film, by winding or laminating the stacked metalized films, and by pressing wound or laminated metalized films in a flat shape. Capacitor element 100 includes two end faces 101 and circumferential surface 102 connecting these end faces 101. Circumferential surface 102 includes two flat surfaces 102a and two circular arc surfaces 102b connecting flat surfaces 102a. And a central part of each circular arc surface 102b is a flat surface. Capacitor element 100 has a substantially flat elliptic cylindrical shape as a whole.

In capacitor element 100, first end-face electrode 110 is formed on one end face 101 by spraying metal such as zinc, and second end-face electrode 120 is formed on another end face 101 by spraying metal such as zinc. Three capacitor elements 100 are arranged in the right-and-left direction such that first end-face electrodes 110 and second end-face electrodes 120 are respectively directed upward and downward while flat surfaces 102a of circumferential surfaces 102 are adjacent to each other. In this state, first bus bar 200 and second bus bar 300 are connected to three capacitor elements 100.

Capacitor element 100 according to the present exemplary embodiment is made of a metallized film in which aluminum is vapor-deposited on a dielectric film. Meanwhile, capacitor element 100 may be made of a metallized film in which another metal such as zinc or magnesium is vapor-deposited. Alternatively, capacitor element 100 may be made of a metallized film on which a plurality of metals of these metals are vapor-deposited, or may be made of a metallized film on which an alloy of these metals is vapor-deposited.

Figure 3A:
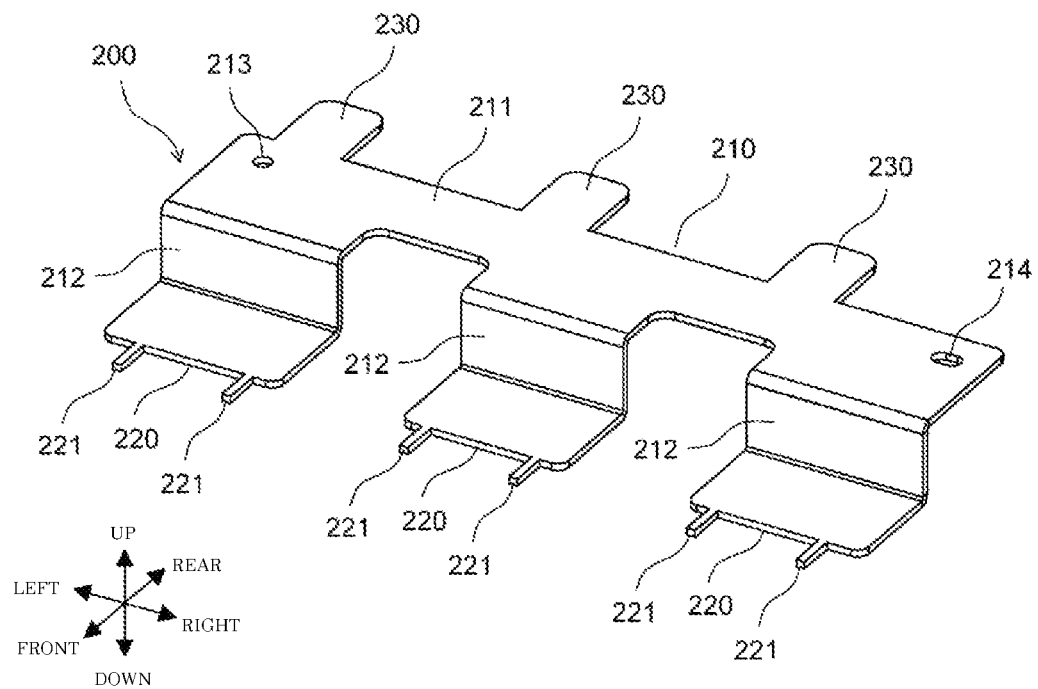
FIG. 3A is a perspective view illustrating a first bus bar according to the exemplary embodiment.
Figure 3B:
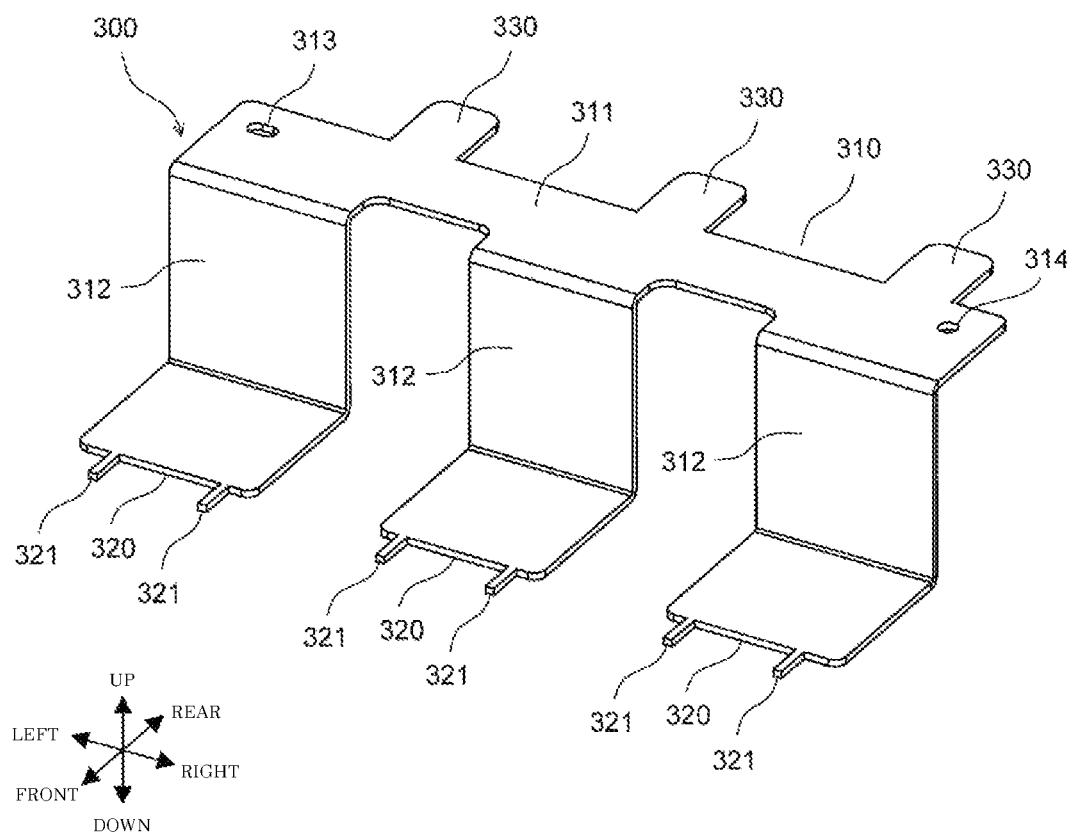
FIG. 3B is a perspective view illustrating a second bus bar according to the exemplary embodiment.

FIG. 3A is a perspective view illustrating first bus bar 200, and FIG. 3B is a perspective view illustrating second bus bar 300.

First bus bar 200 is formed by appropriately cutting out and bending a conductive material such as a copper plate, and has a configuration in which first body portion 210, three first electrode terminal portions 220, and three first connection terminal portions 230 are integrated.

First body portion 210 includes upper surface portion 211 having a rectangular plate-shape elongated in the right-and-left direction and three front surface portions 212 each having a rectangular plate-shape hanging down from a front edge of upper surface portion 211. Three front surface portions 212 are respectively provided at a central part, a left end part, and a right end part of the front edge of upper surface portion 211. Front surface portion 212 located at the center is arranged to have a predetermined interval with respect to each of front surface portions 212 located at the right and at the left. A front edge part of upper surface portion 211 is cut out at a region between two front surface portions 212 to be recessed rearward. A left end part of upper surface portion 211 has circular through-hole 213, and a right end part of upper surface portion 211 has oblong through-hole 214 elongated in the right-and-left direction.

Each of three first electrode terminal portions 220 has a rectangular plate shape and extends frontward from a front edge of corresponding one of three front surface portions 212 of first body portion 210. First electrode terminal portion 220 has two connection pins 221 arranged in the right-and-left direction at a front edge.

Each of three first connection terminal portions 230 has a rectangular plate shape and extends rearward from a rear edge of upper surface portion 211 of first body portion 210. Three first connection terminal portions 230 are arranged in the right-and-left direction with a predetermined interval between each other, and are located to be slightly shifted to the left side from a center of upper surface portion 211.

Second bus bar 300 is formed by appropriately cutting out and bending a conductive material such as a copper plate, and has a configuration in which second body portion 310, three second electrode terminal portions 320, and three second connection terminal portions 330 are integrated.

Second body portion 310 includes upper surface portion 311 having a rectangular plate-shape elongated in the right-and-left direction and three front surface portions 312 each having a rectangular plate-shape hanging down from a front edge of upper surface portion 311. Three front surface portions 312 are respectively provided at a central part, a left end part, and a right end part of the front edge of upper surface portion 311. Front surface portion 312 located at the center is arranged to have a predetermined interval with respect to each of front surface portions 312 located at the right and at the left. A front edge part of upper surface portion 311 is cut out at a region between two front surface portions 312 to be recessed rearward. A left end part of upper surface portion 311 has an oblong through-hole 313 elongated in the right-and-left direction, and a right end part of upper surface portion 311 has circular through-hole 314. Each of three front surface portions 312 of second body portion 310 is longer in the up-and-down direction than each of three front surface portions 212 of first body portion 210.

Each of three second electrode terminal portions 320 has a rectangular plate shape and extends frontward from a front edge of corresponding one of three front surface portions 312 of second body portion 310. Second electrode terminal portion 320 has two connection pins 321 arranged in the right-and-left direction at a front edge. Each of three second electrode terminal portions 320 is longer in the front-and-rear direction than each of three first electrode terminal portions 220.

Each of three second connection terminal portions 330 has a rectangular plate shape and extends rearward from a rear edge of upper surface portion 311 of second body portion 310. Three second connection terminal portions 330 are arranged in the right-and-left direction with a predetermined interval between each other, and are located to be slightly shifted to the right side from a center of upper surface portion 311.

Figure 4A:
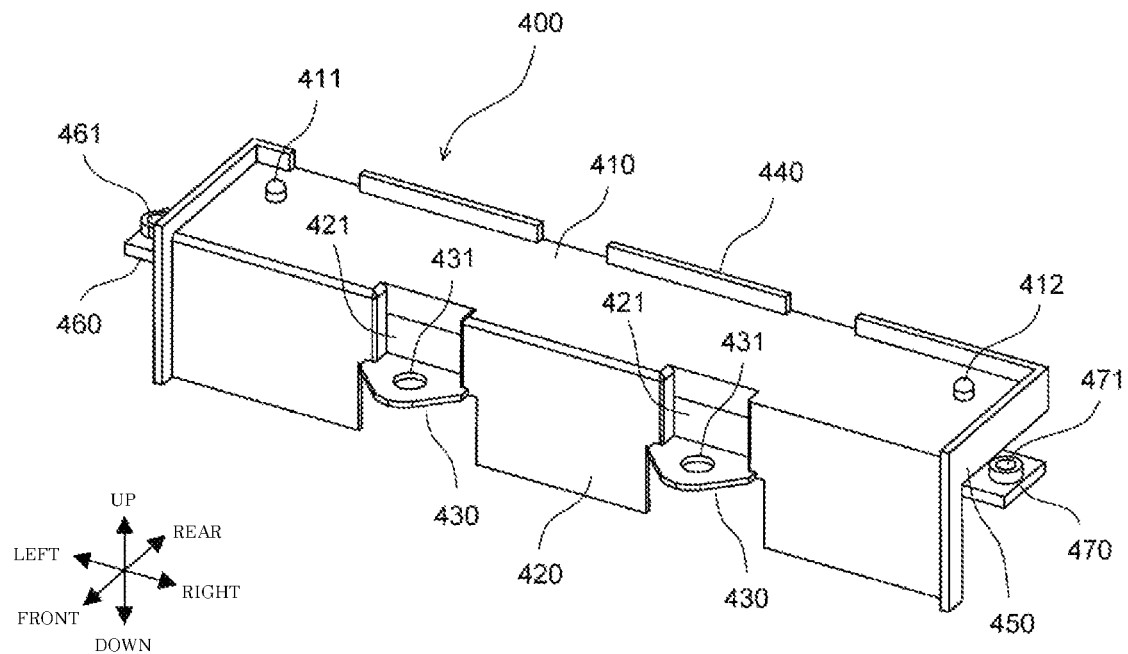
FIG. 4A is an upper front perspective view illustrating an insulating plate according to the exemplary embodiment.
Figure 4B:
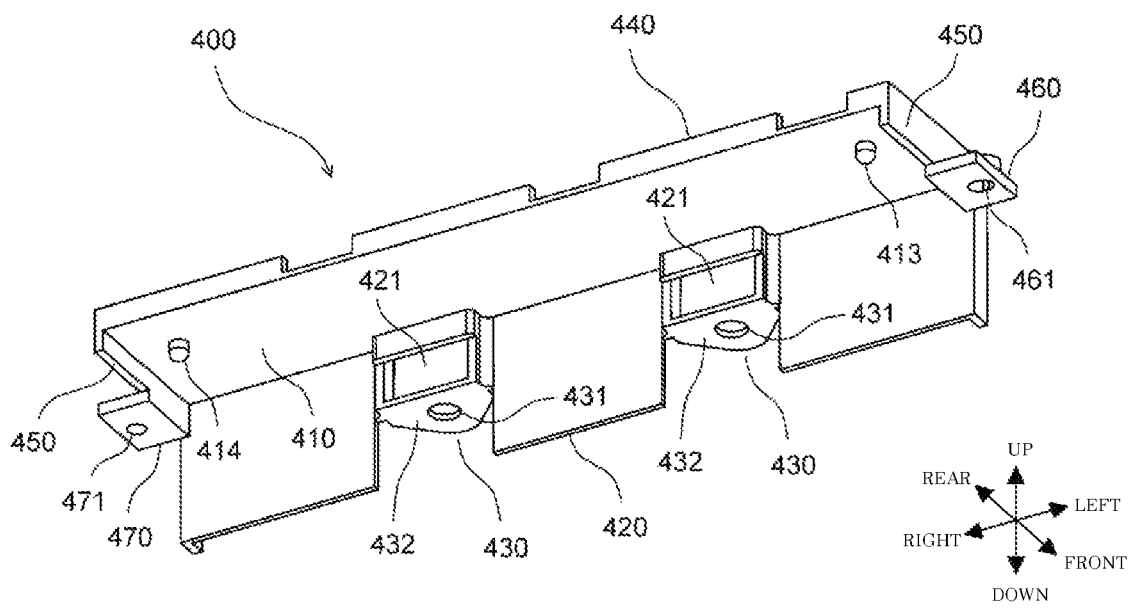
FIG. 4B is a lower rear perspective view illustrating the insulating plate according to the exemplary embodiment.

FIG. 4A is an upper front perspective view illustrating insulating plate 400, and FIG. 4B is a lower rear perspective view illustrating insulating plate 400.

Insulating plate 400 is made of resin such as polyphenylene sulfide (PPS), and has an insulation property. Insulating plate 400 includes first insulating portion 410 and second insulating portion 420.

First insulating portion 410 has a rectangular plate shape elongated in the right-and-left direction. On a surface (upper surface) of first insulating portion 410, a left end part and a right end part of first insulating portion 410 respectively have cylindrical protrusions 411 and 412. On a back surface (lower surface) of first insulating portion 410, the left end part and the right end part of first insulating portion 410 respectively have cylindrical protrusions 413 and 414. An outer diameter of protrusion 411 is substantially equal to an inner diameter of through-hole 213 of first bus bar 200, and an outer diameter of protrusion 412 is substantially equal to a short-side inner diameter of through-hole 214 of first bus bar 200. An outer diameter of protrusion 413 is substantially equal to a short-side inner diameter of through-hole 313 of second bus bar 300, and an outer diameter of protrusion 414 is substantially equal to an inner diameter of through-hole 314 of second bus bar 300.

Second insulating portion 420 has a rectangular plate shape elongated in the right-and-left direction, and extends downward from a front edge of first insulating portion 410. Second insulating portion 420 includes two mounting tabs 430 each having a pentagonal plate shape. Two mounting tabs 430 are arranged in the right-and-left direction.

Each of two mounting tabs 430 is disposed to be parallel to the upper surface of first insulating portion 410, and is positioned at the center of second insulating portion 420 in the up-and-down direction. A distance between two mounting tabs 430 is equal to a distance between two mounting bosses (to be described later) of case 500. Each of mounting tabs 430 has circular through-hole 431. Back surface (lower surface) of each of mounting tabs 430 serves as mounting surface 432 for the mounting boss.

Second insulating portion 420 is opened below each of mounting tabs 430. Second insulating portion 420 above each of mounting tabs 430 is recessed rearward, and rectangular opening portions 421 is formed in the recessed part.

On the surface of insulating plate 400, insulating plate 400 has rib 440 at a left edge, a right edge, and a rear edge of first insulating portion 410 and at a left edge and a right edge of second insulating portion 420. Rib 440 extends along these edges. Rib 440 is interrupted at positions corresponding to first connection terminal portions 230 of first bus bar 200. On a back surface of insulating plate 400, insulating plate 400 has ribs 450 that extend respectively along the left edge and the right edge of first insulating portion 410.

Rib 450 at the left edge and rib 450 at the right edge of insulating plate 400 respectively have positioning tabs 460, 470 at a lower end of each of ribs 450. Positioning tabs 460, 470 respectively extend leftward and rightward from a front side of the lower end of rib 450 on the back surface. Each pf left and right positioning tabs 460, 470 is disposed to be parallel to the upper surface of first insulating portion 410. Positioning tab 460 has oval through-hole 461 elongated in the right-and-left direction. Positioning tab 470 has circular through-hole 471.

At the time of assembling capacitor element unit 10, first bus bar 200 is placed on the upper surface of insulating plate 400 from above, and second bus bar 300 is placed on the back surface of insulating plate 400 from below. In this step, protrusions 411, 412 of insulating plate 400 are respectively fitted into through-holes 213, 214 of first bus bar 200. Protrusions 413, 414 of insulating plate 400 are respectively fitted into through-holes 313, 314 of second bus bar 300. As a result, first bus bar 200 and second bus bar 300 are positioned and fixed to insulating plate 400 in the front-and-rear direction and the right-and-left direction.

Three capacitor elements 100 are installed between three first electrode terminal portions 220 of first bus bar 200 and three second electrode terminal portions 320 of second bus bar 300. First electrode terminal portions 220 are in contact with respective ones of first end-face electrodes 110 of capacitor elements 100, and second electrode terminal portions 320 are in contact with respective ones of second end-face electrodes 120 of capacitor elements 100. Connection pins 221 of first electrode terminal portions 220 are bonded to first end-face electrodes 110 by a bonding method such as soldering. As a result, first bus bar 200 is electrically connected to first end-face electrodes 110 of three capacitor elements 100. Similarly, connection pins 321 of second electrode terminal portion 320 are bonded to second end-face electrodes 120 by a bonding method such as soldering. Consequently, second bus bar 300 is electrically connected to second end-face electrodes 120 of three capacitor elements 100.

By connecting first bus bar 200 and second bus bar 300 to three capacitor elements 100, each of first bus bar 200 and second bus bar 300 is fixed to insulating plate 400 in the up-and-down direction, and does not come off from insulating plate 400 in the up-and-down direction. In this way, three capacitor elements 100, first bus bar 200, second bus bar 300, and insulating plate 400 are integrated to complete capacitor element unit 10 as shown in FIGS. 2A and 2B.

First body portion 210 of first bus bar 200 and second body portion 310 (except the lower parts of front surface portions 312) of second bus bar 300 overlap each other (in other words, face each other) with insulating plate 400 interposed between first body portion 210 and second body portion 310. As a result, an equivalent series inductance (ESL) of first bus bar 200 and second bus bar 300 can be effectively reduced.

Figure 5A:
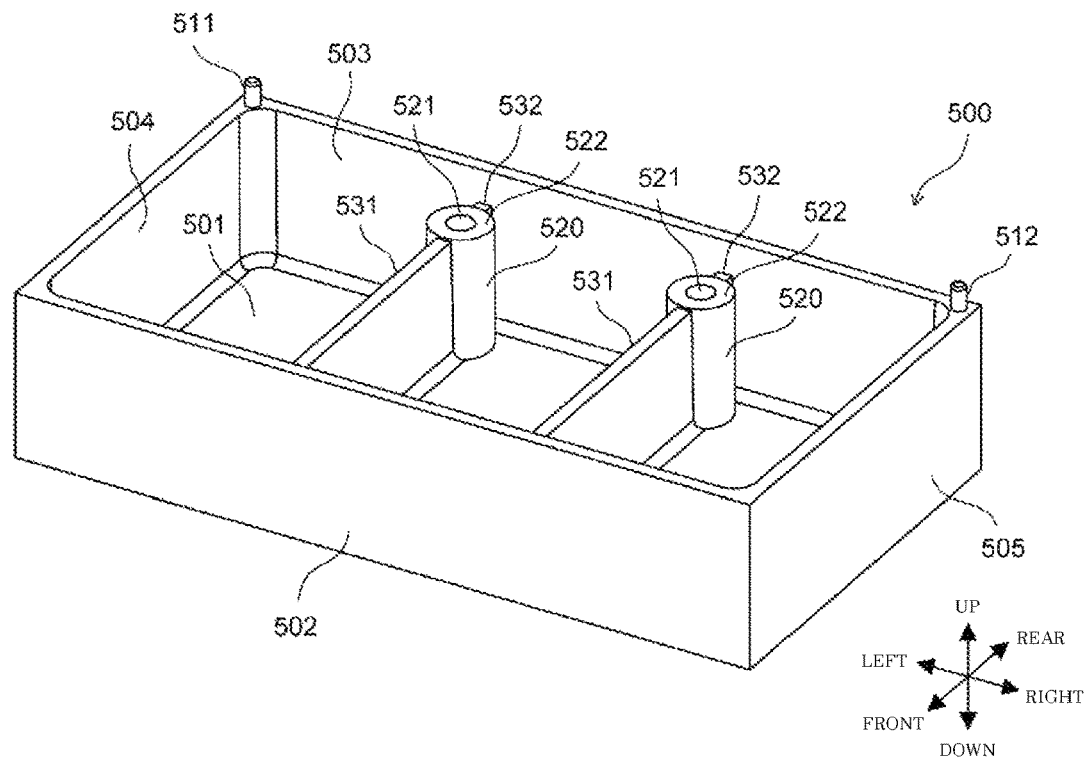
FIG. 5A is a perspective view illustrating a case according to the exemplary embodiment.
Figure 5B:
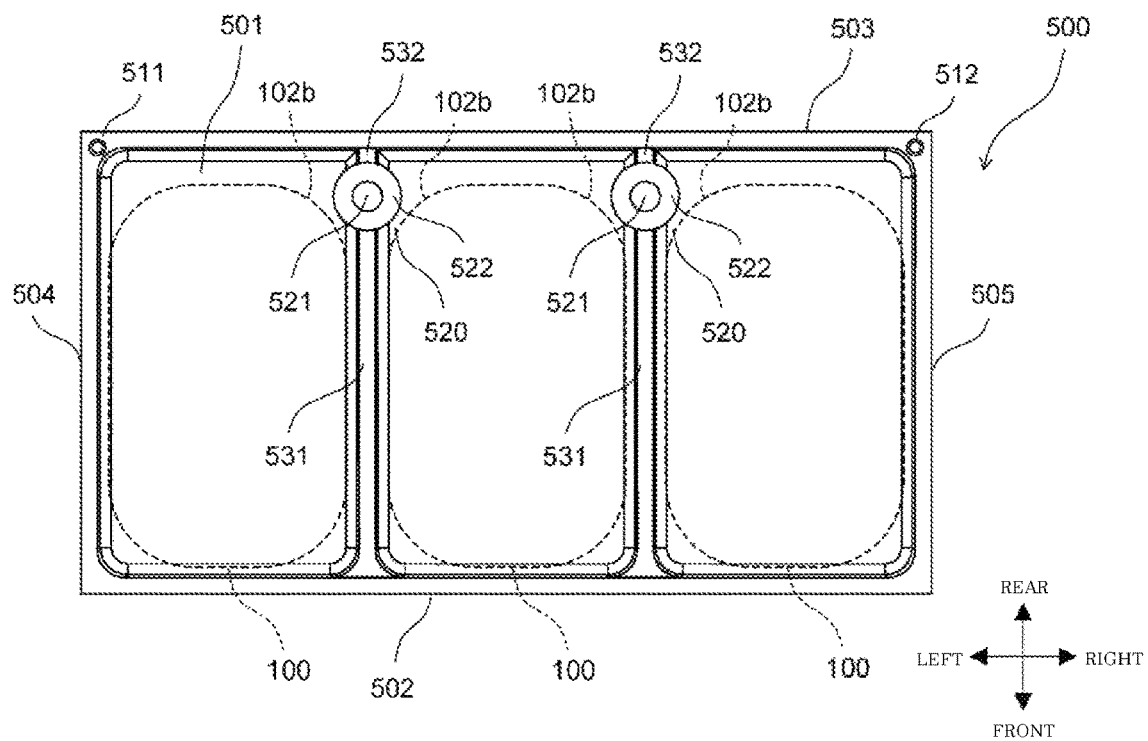
FIG. 5B is a plan view illustrating the case according to the exemplary embodiment.

FIG. 5A is a perspective view illustrating case 500, and FIG. 5B is a plan view illustrating case 500. In FIG. 5B, three capacitor elements 100 disposed in case 500 are indicated by broken lines for description of case 500.

Case 500 is made of metal and, for example, is formed by the aluminum die casting method. Case 500 is formed to have a box shape of a rectangular parallelepiped. Case 500 has bottom surface portion 501, front side surface portion 502, rear side surface portion 503, left side surface portion 504, and right side surface portion 505. And each of front side surface portion 502, rear side surface portion 503, left side surface portion 504, and right side surface portion 505 rises from bottom surface portion 501. An upper face of case 500 is opened. Regarding case 500, the right-and-left direction is the longitudinal direction in which three capacitor elements 100 housed in case 500 are arranged, and the front-and-rear direction is the transverse direction.

Case 500 has cylindrical protrusions 511, 512 that are respectively formed on at an upper end of a corner between left side surface portion 504 and rear side surface portion 503 and at an upper end of a corner between right side surface portion 505 and rear side surface portion 503. An outer diameter of protrusion 511 is substantially equal to a short-side inner diameter of through-hole 461 of positioning tab 460 of insulating plate 400. An outer diameter of protrusion 512 is substantially equal to an inner diameter of through-hole 471 of positioning tab 470 of insulating plate 400.

Case 500 has two cylindrical mounting bosses 520. Mounting bosses 520 are arranged in the right-and-left direction on a rear part of an inner surface of bottom surface portion 501, that is, an inner bottom surface. Mounting boss 520 at the left side is located in a triangular prism space that is surrounded by circular arc surface 102b of capacitor element 100 at the left end, circular arc surface 102b of capacitor element 100 at the center, and rear side surface portion 503. Mounting boss 520 at the right side is located in a triangular prism space surrounded by circular arc surface 102b of capacitor element 100 at the right end, circular arc surface 102b of capacitor element 100 at the center, and rear side surface portion 503. As described above, since two mounting bosses 520 are provided using the open space formed by three capacitor elements 100 disposed in case 500, a size of case 500 is less likely to increase. In addition, it is possible to reduce an amount of filler resin 600 that would normally fill the empty space, and filler resin 600 can therefore be saved.

In an upper end face of mounting boss 520, mounting boss 520 has screw hole 521 in which a female thread is formed. Upper end face of mounting boss 520 serves as mounting surface 522 to which mounting tab 430 of insulating plate 400 is attached. Mounting surface 522 is parallel to the inner bottom surface of case 500. Each of mounting boss 520 is connected to front side surface portion 502 by rib 531, and is connected to rear side surface portion 503 by rib 532. Both of ribs 531, 532 have substantially the same height as mounting bosses 520. Front-side rib 531 passes through a gap between two neighboring capacitor elements 100. Mounting boss 520 is reinforced by two ribs 531, 532.

Figure 6A:
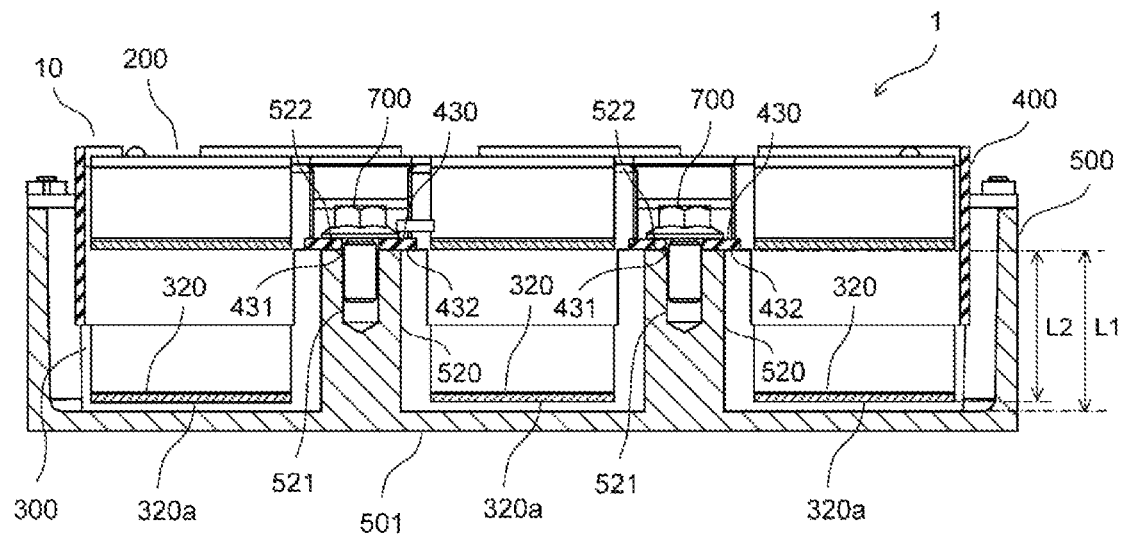
FIG. 6A is a front cross-sectional view illustrating the film capacitor according to the exemplary embodiment cut at a coupling position between mounting tabs and mounting bosses.
Figure 6B:
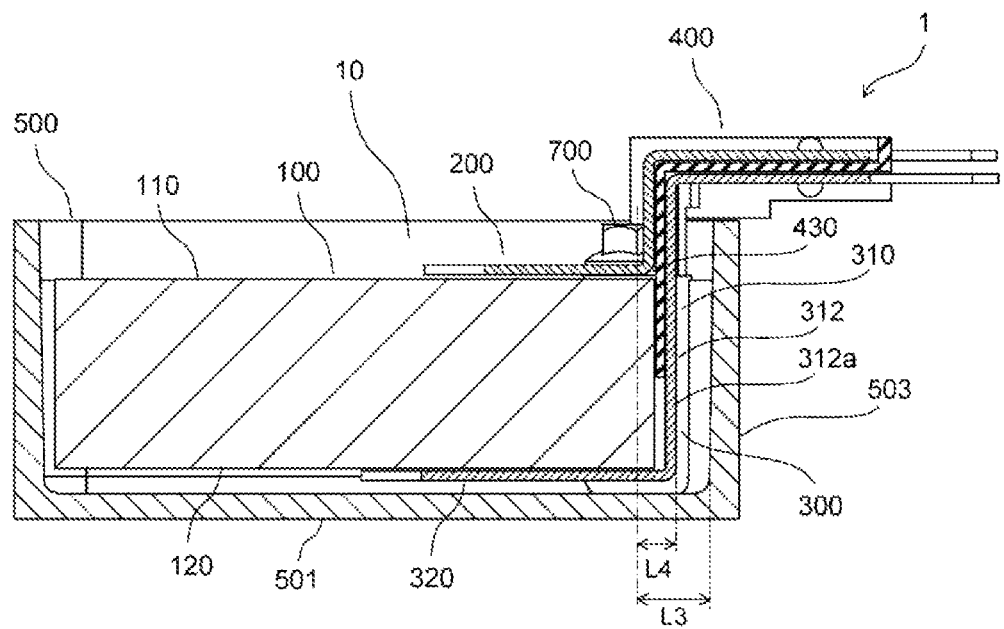
FIG. 6B is a side cross-sectional view illustrating the film capacitor according to the exemplary embodiment cut at a center position.

FIG. 6A is a front cross-sectional view illustrating film capacitor 1 cut at a coupling position between mounting tabs 430 and mounting bosses 520, and FIG. 6B is a side cross-sectional view illustrating film capacitor 1 cut at a center position. FIGS. 6A and 6B illustrate film capacitor 1 before case 500 is filled with filler resin 600.

As shown in FIGS. 1B, 6A, and 6B, capacitor element unit 10 is placed in case 500 from above. In this step, protrusions 511, 512 of case 500 are respectively fitted into through-hole 461 of positioning tab 460 and through-hole 471 of positioning tab 470 in insulating plate 400. Consequently, capacitor element unit 10 is positioned and fixed to case 500 in the front-and-rear direction and the right-and-left direction, and located at a predetermined position with respect to case 500. Two mounting tabs 430 of insulating plate 400 are respectively placed on two mounting bosses 520 of case 500. Mounting surface 432 of mounting tab 430 is in contact with mounting surface 522 of mounting boss 520, and through-hole 431 of mounting tab 430 and screw hole 521 of mounting boss 520 are aligned. Protrusions 511, 512 are robust because they are formed at corners, which are highly rigid in case 500. Thus, capacitor element unit 10 can be firmly positioned by using protrusions 511, 512.

Two bolts 700 are respectively fastened in screw holes 521 of two mounting bosses 520 while respectively passing through through-holes 431 of two mounting tabs 430. In this way, two mounting tabs 430 are respectively attached to two mounting bosses 520 and fixed with two bolts 700. Consequently, capacitor element unit 10 is fixed to case 500 by using parts of insulating plate 400.

As shown in FIG. 6A, distance L1 (a height of mounting bosses 520) between mounting surface 522 of mounting boss 520 and the inner bottom surface (an inner surface of bottom surface portion 501) of case 500 is set to be larger than distance L2 between mounting surface 432 of mounting tab 430 and outer surface 320a (surface facing the inner bottom surface of case 500) of second electrode terminal portion 320 of second bus bar 300. With this arrangement, second electrode terminal portion 320 of second bus bar 300 is disposed away from the inner bottom surface of case 500 and is not in contact with the inner bottom surface. As shown in FIG. 6B, second end-face electrode 120 of capacitor element 100, which is located above second electrode terminal portion 320, is not in contact with the inner bottom surface of case 500, either.

Further, as shown in FIG. 6B, distance L3 from a center of screw hole 521 of mounting boss 520 to an inner surface of rear side surface portion 503 of case 500 is larger than distance L4 from a center of through-hole 431 of mounting tab 430 to outer surface 312a of front surface portion 312 of second body portion 310 of second bus bar 300. With this arrangement, front surface portion 312 of second body portion 310 of second bus bar 300 is disposed away from an inner surface of rear side surface portion 503 of case 500, and is not in contact with the inner surface.

After capacitor element unit 10 is put in case 500, filler resin 600 in a liquid phase is injected into case 500. In this step, filler resin 600 in a central part of case 500 can flow through two openings 421 of insulating plate 400, and thus easily spread into a space between second bus bar 300 and rear side surface portion 503 of case 500. Case 500 is filled with filler resin 600 up to a position above two mounting tabs 430 of insulating plate 400. And a space between capacitor element unit 10 and case 500 is filled with filler resin 600. After the injection of filler resin 600 is completed, case 500 is heated so that filler resin 600 in case 500 is cured. Capacitor element unit 10 is also fixed to case 500 with cured filler resin 600.

As a result, as shown in FIG. 1A, film capacitor 1 is completed.

Film capacitor 1 is mounted on, for example, an electric vehicle, and can be connected to a direct-current power supply device that drives the electric motor or the like. In this case, three external terminals of one polarity from the power supply device are respectively connected to three first connection terminal portions 230 of first bus bar 200 by soldering or welding, and three external terminals of the other polarity are respectively connected to three second connection terminal portions 330 of second bus bar 300 by soldering or welding. In the case where the external terminal is connected to first bus bar 200 or second bus bar 300 by screws, a through-hole through which the screw passes is formed in first connection terminal portion 230 or second connection terminal portion 330.

A large direct current from a power supply device may be input to film capacitor 1. In this case, heat is likely to be generated by capacitor elements 100, first bus bar 200, and second bus bar 300 due to the large current flow. In the present exemplary embodiment, since case 500 is made of metal, the generated heat is easily dissipated from case 500.

Advantageous Effects of Exemplary Embodiment

The present exemplary embodiment provides the following advantageous effects.

Capacitor element 100, first bus bar 200, second bus bar 300, and insulating plate 400 are integrally assembled to constitute capacitor element unit 10, and capacitor element unit 10 is housed in metal case 500. Insulating plate 400 includes mounting tab 430, and case 500 includes mounting boss 520 to which mounting tab 430 is attached such that capacitor element unit 10 is located at a predetermined position with respect to case 500 while first bus bar 200 and second bus bar 300 are not in contact with case 500.

With this configuration, since case 500 is made of metal, heat dissipation from case 500 is improved, and film capacitor 1 is less likely to have high temperatures. In addition, since insulating plate 400 having an insulation property comes into contact with case 500 when capacitor element unit 10 is located at a predetermined position with respect to case 500, first bus bar 200 and second bus bar 300 are not in contact with case 500 so that insulation of first bus bar 200 and second bus bar 300 from metal case 500 can be secured.

Capacitor element 100 is disposed in case 500 such that second end-face electrode 120 faces the inner bottom surface of case 500. Second bus bar 300 includes second electrode terminal portion 320 that are located between second end-face electrode 120 and the inner bottom surface of case 500 and are connected to second end-face electrodes 120. In such a case, mounting tab 430 is attached to mounting boss 520 such that second electrode terminal portion 320 is not in contact with the inner bottom surface of case 500.

Specifically, mounting boss 520 includes mounting surface 522 that is parallel to the inner bottom surface of case 500, and mounting tab 430 includes mounting surface 432 that is in contact with mounting surface 522 of mounting boss 520. Distance L1 between mounting surface 522 of mounting boss 520 and the inner bottom surface of case 500 is set to be larger than distance L2 between mounting surface 432 of mounting tab 430 and outer surface 320a of second electrode terminal portion 320.

With this configuration, a gap can be provided between the inner bottom surface of case 500 and second electrode terminal portion 320 of second bus bar 300 without providing a support portion or the like that protrudes from the inner bottom surface of case 500 to support capacitor element unit 10. As a result, the current flowing through second bus bar 300 is prevented from leaking to case 500 through the support portion and the like, and insulation between second bus bar 300 and metal case 500 can be secured.

Further, since mounting tab 430 is attached to mounting boss 520 by bolt 700, insulating plate 400, that is, capacitor element unit 10 can be firmly fixed to case 500.

In the present exemplary embodiment, contact between second end-face electrode 120 of capacitor element 100 and the inner bottom surface of case 500 can also be avoided, so that insulation between capacitor element 100 and metal case 500 can also be secured.

The exemplary embodiment of the present invention has been described above. Meanwhile, the present invention is not limited to the exemplary embodiment described above, and application examples of the present invention can be modified in various manners in addition to the above exemplary embodiment.

First Modification

Figure 7A:
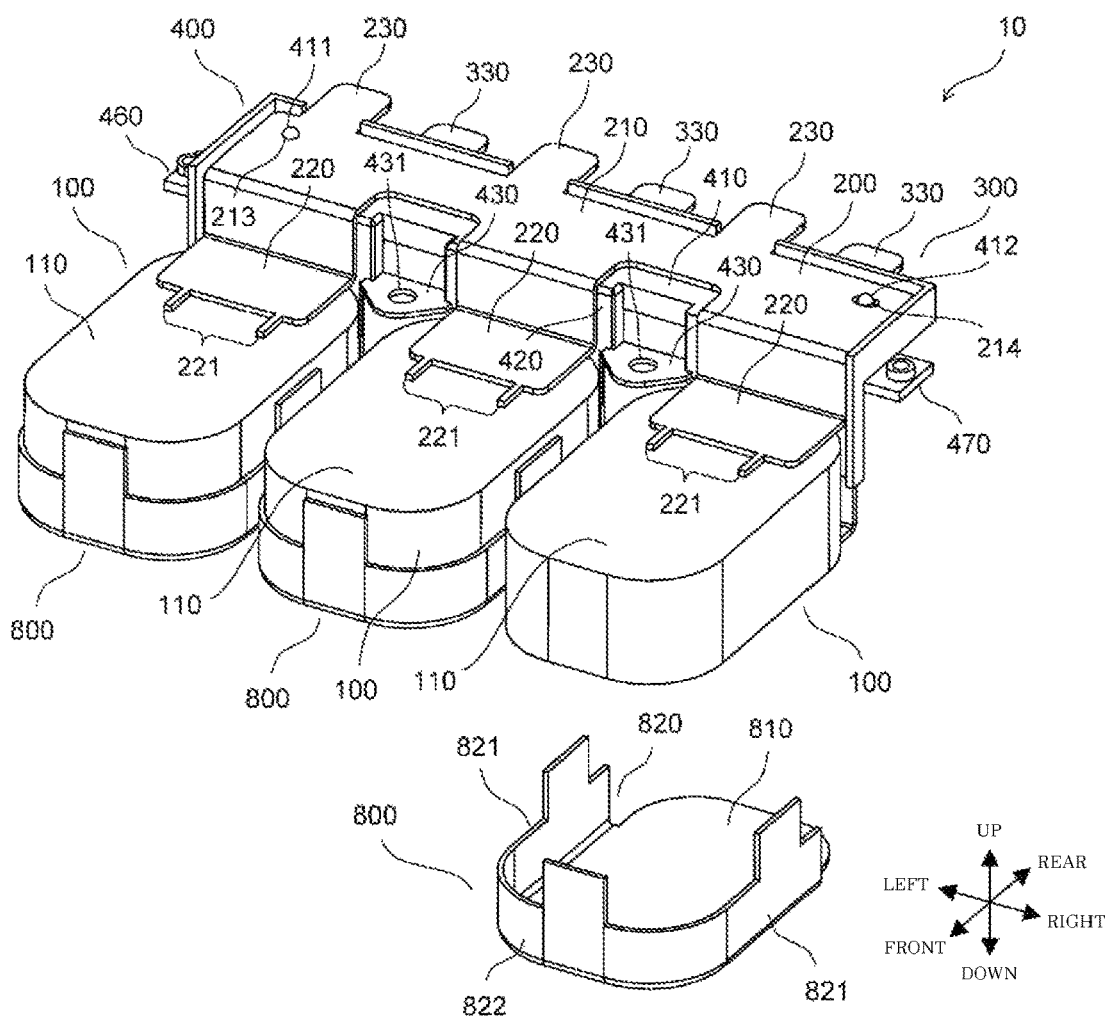
FIG. 7A is a perspective view illustrating a capacitor element unit according to a first modification when one insulating cover is detached.
Figure 7B:
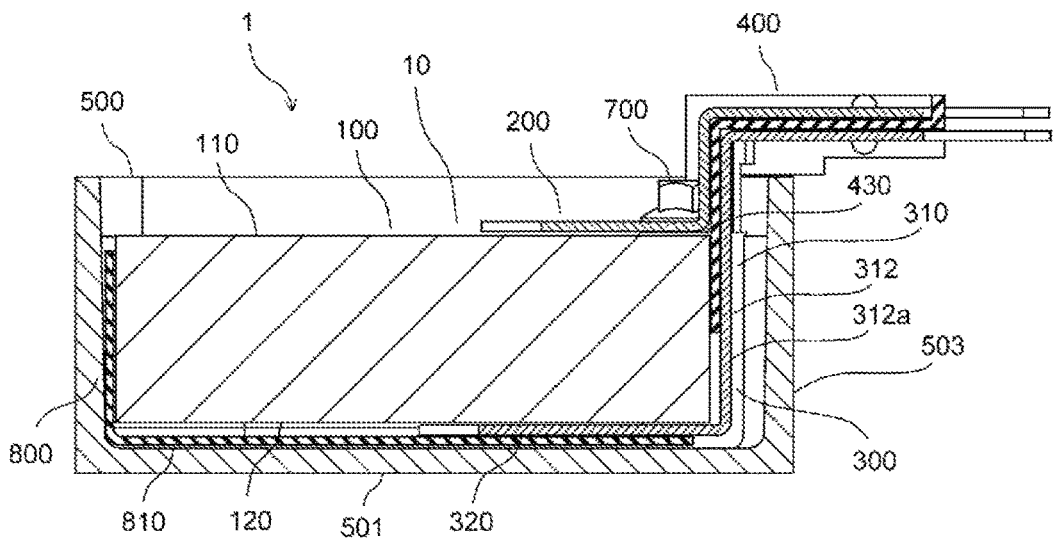
FIG. 7B is a side cross-sectional view illustrating a film capacitor according to the first modification when the film capacitor is cut at a center position.

FIG. 7A is a perspective view illustrating capacitor element unit 10 according to a first modification when one of insulating covers 800 is detached, and FIG. 7B is a side cross-sectional view illustrating film capacitor 1 according to the first modification when film capacitor 1 is cut at a center position. FIG. 7B shows film capacitor 1 before case 500 is filled with filler resin 600.

In the first modification, capacitor element unit 10 includes three insulating covers 800. Insulating cover 800 corresponds to a "second insulating member" recited in the claims.

Insulating cover 800 is made of resin such as polyphenylene sulfide (PPS), and have an insulation property. Insulating cover 800 includes bottom surface portion 810 and circumferential surface portion 820.

Bottom surface portion 810 has substantially the same shape and substantially the same size as end face 101 of capacitor element 100. A thickness of bottom surface portion 810 is made substantially equal to a gap that is formed between the inner bottom surface of case 500 and second electrode terminal portion 320 of second bus bar 300 when capacitor element unit 10 is housed in case 500.

Circumferential surface portion 820 includes two flat portions 821 and circular arc portion 822 connecting between front ends of flat portions 821. The central part of circular arc portion 822 is a flat surface. A central part of each of two flat portions 821 and a central part of circular arc portion 822 are extended upward from the other parts. Except the central portion of each of flat portions 821 and the central part of circular arc portion 822, a height of circumferential surface portion 820 is set to about a half of a size (height) of capacitor element 100 in the end face direction so as not to hinder heat dissipation from capacitor element 100.

Insulating cover 800 is fitted into lower portion of capacitor elements 100 from below. Consequently, second end-face electrode 120 of capacitor element 100 and second electrode terminal portion 320 of second bus bar 300 are covered with bottom surface portion 810 of insulating cover 800. As shown in FIG. 7B, in the state where capacitor element unit 10 is housed in case 500, insulating cover 800 is interposed between the inner bottom surface of case 500 (the inner surface of bottom surface portion 501) and both of second end-face electrode 120 and second electrode terminal portion 320.

With the configuration of the first modification, second bus bar 300 and metal case 500 are further less likely to come into contact with each other, and the insulation between second bus bar 300 and metal case 500 is further secured.

Insulating cover 800 is preferably used when it is concerned that second electrode terminal portion 320 of second bus bar 300 and the inner bottom surface of case 500 may come in contact with each other according to rigidity of capacitor element unit 10 and mounting accuracy of capacitor element 10 on case 500. Otherwise, considering heat dissipation or product cost of capacitor element 100 or the like, it is preferable that insulating cover 800 is not used.

Other Modifications

In the exemplary embodiment described above, mounting tab 430 of insulating plate 400 is attached to mounting boss 520 of case 500 with bolt 700. Meanwhile, the method for attaching mounting tab 430 to mounting boss 520 is not limited to the above method. For example, in a configuration example shown in FIG. 8A, mounting tab 430 has protrusion 433 protruding downward, and mounting boss 520 has holes 523 corresponding to protrusion 433. By fitting protrusion 433 into hole 523 from above, mounting tab 430 is attached to mounting boss 520 so that insulating plate 400 is fixed to case 500. Further, in a configuration example shown in FIG. 8B, mounting boss 520 has protrusion 524 protruding upward, and mounting tab 430 has hole 434 corresponding to protrusion 524. By fitting protrusion 524 into hole 434 from below, mounting tab 430 is attached to mounting boss 520 so that insulating plate 400 is fixed to case 500.

Figure 8A:
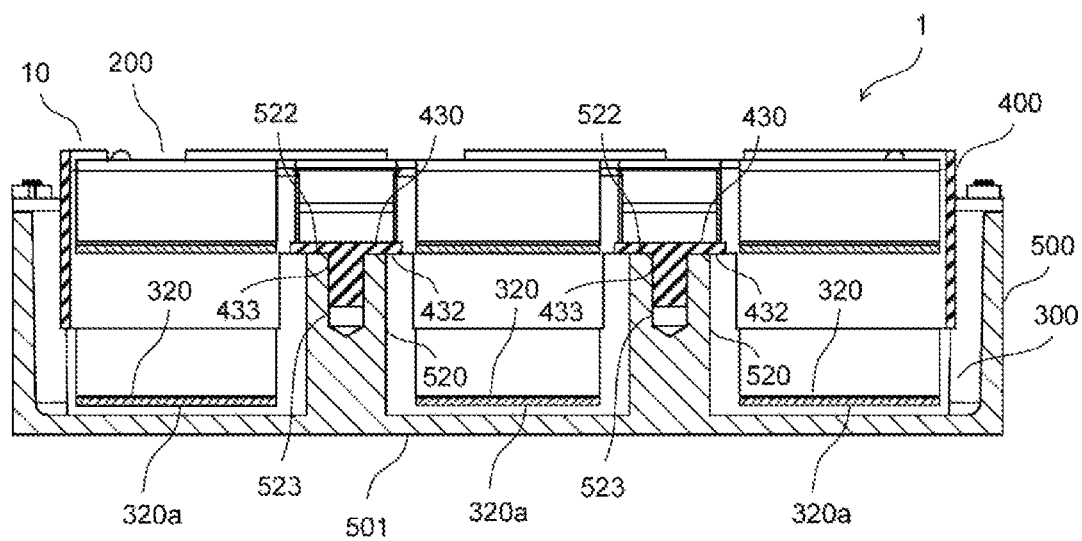
FIG. 8A is a diagram for describing a film capacitor according to other modification.
Figure 8B:
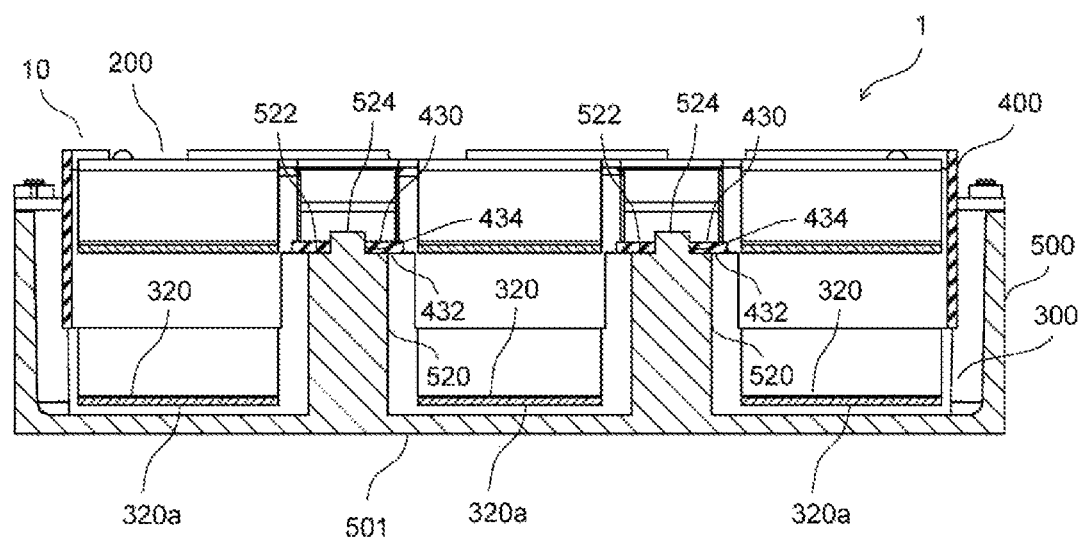
FIG. 8B is a diagram for describing a film capacitor according to other modification.

When the configurations in FIGS. 8A and 8B are employed, mounting tab 430 can be easily attached to mounting boss 520 without requiring screwing work.

In the above exemplary embodiment, mounting tab 430 exemplifies first mounting portion, and mounting boss 520 exemplifies the second mounting portion. Meanwhile, as long as capacitor element unit 10 is located at a predetermined position with respect to case 500 while first bus bar 200 and second bus bar 300 are not in contact with case 500, each of the first mounting portion and the second mounting portion may have any shape, and the first mounting portion and the second mounting portion may be disposed at any positions.

In the above exemplary embodiment, capacitor element 100 is disposed in case 500 such that one end-face electrode (second end-face electrode 120) faces the inner bottom surface of case 500. Meanwhile, in film capacitor 1, the capacitor element may be disposed in such an orientation that, in the inside of the case, the two end-face electrodes face the inner surfaces of the case, for example, the two end-face electrodes face the inner surfaces of the front surface portion and the rear side surface portion. In an embodiment of this configuration, the case includes a mounting boss to which a mounting tab of an insulating plate is attached such that a first electrode terminal portion of a first bus bar connected to a first end-face electrode and a second electrode terminal portion of a second bus bar connected to a second end-face electrode are not in contact with inner surfaces of the case to which the respective electrode terminal portions are opposed.

In the above exemplary embodiment, capacitor element unit 10 includes three capacitor elements 100. Meanwhile, a number of capacitor elements 100 can be changed as appropriate, including the case where the number is one.

Further, in the above exemplary embodiment, capacitor element 100 is formed by stacking, one on the other, two metallized films in each of which aluminum is vapor-deposited on a dielectric film and by winding or laminating the stacked metallized films. Alternatively, capacitor element 100 may be formed by stacking the following films one on the other: a metallized film in which aluminum is vapor deposited on both surfaces of a dielectric film; and an insulating film, and by winding or laminating the stacked films.

In the above exemplary embodiment, film capacitor 1 is cited as an example of the capacitor according to the present invention. Meanwhile, the present invention can be applied to capacitors other than film capacitor 1.

Further, the exemplary embodiment of the present invention can be modified in various ways as appropriate within the scope of the technical idea disclosed in the appended claims.

In the description of the above exemplary embodiment, terms indicating directions such as "upward" and "downward" indicate relative directions that depend only on a relative positional relationship of constituent members, and do not indicate absolute directions such as the vertical direction and the horizontal direction.

The present invention is useful for capacitors used for various types of electronic equipment, electrical devices, industrial equipment, vehicular electric equipment, and the like.

What is claimed is:

1. A capacitor comprising:
    a capacitor element unit; and
    a case that is made of a metal and houses the capacitor element unit,
    the capacitor element unit including:
        a capacitor element;
        a first electrode disposed on one of both end faces of the capacitor element;
        a second electrode disposed on another one of the both end faces of the capacitor element;
        a first bus bar connected to the first electrode, the first bus bar including a first region;
        a second bus bar connected to the second electrode, the second bus bar including a second region facing the first region; and
        a first insulating member that has an insulation property and is disposed between the first region and the second region, wherein:
    the first insulating member includes a first mounting portion,
    the case includes a second mounting portion to which the first mounting portion is attached so that the capacitor element unit is located at a predetermined position with respect to the case while the first bus bar and the second bus bar are not in contact with the case,
    the capacitor element is disposed in the case so that the second electrode faces an inner bottom surface of the case,
    the second bus bar includes an electrode connection portion connected to the second electrode, the electrode connection portion being disposed between the second electrode and the inner bottom surface of the case,
    the first mounting portion is attached to the second mounting portion so that the electrode connection portion is not in contact with the inner bottom surface of the case,
    the second mounting portion has a mounting surface that is parallel to the inner bottom surface of the case, the first mounting portion has a mounting surface that is in contact with the mounting surface of the second mounting portion, and a distance between the mounting surface of the second mounting portion and the inner bottom surface of the case is greater than a distance between the mounting surface of the first mounting portion and a surface of the electrode connection portion, the surface of the electrode connection portion facing the inner bottom surface of the case.

2. The capacitor according to claim 1, further comprising a second insulating member disposed between the electrode connection portion and the inner bottom surface of the case, the second insulating member having an insulation property.

3. The capacitor according to claim 1, wherein the first mounting portion is attached to the second mounting portion with a screw.

4. The capacitor according to claim 1, wherein:
one of the first mounting portion and the second mounting portion has a protrusion,
another one of the first mounting portion and the second mounting portion has a hole, and
the first mounting portion is attached to the second mounting portion by fitting the protrusion to the hole.

5. A capacitor comprising:
a capacitor element unit; and
a case that is made of a metal and houses the capacitor element unit,
the capacitor element unit including:
a capacitor element;
a first electrode disposed on one of both end faces of the capacitor element;
a second electrode disposed on another one of the both end faces of the capacitor element;
a first bus bar connected to the first electrode, the first bus bar including a first region;
a second bus bar connected to the second electrode, the second bus bar including a second region facing the first region; and
a first insulating member that has an insulation property and is disposed between the first region and the second region, wherein:
the first insulating member includes a first mounting portion,
the case includes a second mounting portion to which the first mounting portion is attached so that the capacitor element unit is located at a predetermined position with respect to the case while the first bus bar and the second bus bar are not in contact with the case, and
the first mounting portion is attached to the second mounting portion with a screw.

6. The capacitor according to claim 5, wherein:
the capacitor element is disposed in the case so that the second electrode faces an inner bottom surface of the case,
the second bus bar includes an electrode connection portion connected to the second electrode, the electrode connection portion being disposed between the second electrode and the inner bottom surface of the case, and
the first mounting portion is attached to the second mounting portion so that the electrode connection portion is not in contact with the inner bottom surface of the case.

7. The capacitor according to claim 6, wherein:
the second mounting portion has a mounting surface that is parallel to the inner bottom surface of the case, the first mounting portion has a mounting surface that is in contact with the mounting surface of the second mounting portion, and a distance between the mounting surface of the second mounting portion and the inner bottom surface of the case is greater than a distance between the mounting surface of the first mounting portion and a surface of the electrode connection portion, the surface of the electrode connection portion facing the inner bottom surface of the case.

8. The capacitor according to claim 6, further comprising a second insulating member disposed between the electrode connection portion and the inner bottom surface of the case, the second insulating member having an insulation property.

9. The capacitor according to claim 5, wherein:
one of the first mounting portion and the second mounting portion has a protrusion,
another one of the first mounting portion and the second mounting portion has a hole, and
the first mounting portion is attached to the second mounting portion by fitting the protrusion to the hole.

10. A capacitor comprising:
a capacitor element unit; and
a case that is made of a metal and houses the capacitor element unit,
the capacitor element unit including:
a capacitor element;
a first electrode disposed on one of both end faces of the capacitor element;
a second electrode disposed on another one of the both end faces of the capacitor element;
a first bus bar connected to the first electrode, the first bus bar including a first region;
a second bus bar connected to the second electrode, the second bus bar including a second region facing the first region; and
a first insulating member that has an insulation property and is disposed between the first region and the second region, wherein:
the first insulating member includes a first mounting portion,
the case includes a second mounting portion to which the first mounting portion of the first insulating member is attached so that the capacitor element unit is located at a predetermined position with respect to the case while the first bus bar and the second bus bar are not in contact with the case,
the case has an opening and an inner bottom surface facing the opening,
a part of the first bus bar and a part of the second bus bar are led out from the opening to an outside of the case,
the second mounting portion has a mounting surface that is parallel to the inner bottom surface of the case, and
the first mounting portion has a mounting surface that is in contact with the mounting surface of the second mounting portion.

11. The capacitor according to claim 10, wherein:
the capacitor element is disposed in the case so that the second electrode faces the inner bottom surface of the case,
the second bus bar includes an electrode connection portion connected to the second electrode, the electrode connection portion being disposed between the second electrode and the inner bottom surface of the case, and the first mounting portion is attached to the second mounting portion so that the electrode connection portion is not in contact with the inner bottom surface of the case.

12. The capacitor according to claim 11, further comprising a second insulating member disposed between the electrode connection portion and the inner bottom surface of the case, the second insulating member having an insulation property.

13. The capacitor according to claim 10, wherein the first mounting portion is attached to the second mounting portion with a screw.

14. The capacitor according to claim 10, wherein:
one of the first mounting portion and the second mounting portion has a protrusion,
another one of the first mounting portion and the second mounting portion has a hole, and
the first mounting portion is attached to the second mounting portion by fitting the protrusion to the hole.

* * * * *